(12) United States Patent
Arandorenko et al.

(10) Patent No.: US 11,847,832 B2
(45) Date of Patent: Dec. 19, 2023

(54) OBJECT CLASSIFICATION FOR AUTONOMOUS NAVIGATION SYSTEMS

(71) Applicant: ZEBRA TECHNOLOGIES CORPORATION, Lincolnshire, IL (US)

(72) Inventors: Peter Arandorenko, Mississauga (CA); Sadegh Tajeddin, Toronto (CA); Asma Azim, Brampton (CA); Vaibhav K. Bhilare, Mississauga (CA)

(73) Assignee: Zebra Technologies Corporation, Lincolnshire, IL (US)

(*) Notice: Subject to any disclaimer, the term of this patent is extended or adjusted under 35 U.S.C. 154(b) by 377 days.

(21) Appl. No.: 17/094,951

(22) Filed: Nov. 11, 2020

(65) Prior Publication Data

US 2022/0147747 A1    May 12, 2022

(51) Int. Cl.

| | |
|---|---|
| *G06K 9/00* | (2022.01) |
| *G06V 20/58* | (2022.01) |
| *G06T 7/50* | (2017.01) |
| *G01C 21/34* | (2006.01) |
| *G01C 21/32* | (2006.01) |
| *G06N 7/01* | (2023.01) |

(52) U.S. Cl.
CPC .......... *G06V 20/58* (2022.01); *G01C 21/32* (2013.01); *G01C 21/3415* (2013.01); *G06N 7/01* (2023.01); *G06T 7/50* (2017.01); *G06T 2207/10028* (2013.01); *G06V 2201/07* (2022.01)

(58) Field of Classification Search
CPC ...... G06V 20/58; G06V 2201/07; G06T 7/50; G06T 2207/10028; G06N 7/01; G01C 21/32; G01C 21/3415
See application file for complete search history.

(56) References Cited

U.S. PATENT DOCUMENTS

| | | |
|---|---|---|
| 5,209,712 A | 5/1993 | Ferri |
| 5,214,615 A | 5/1993 | Bauer |
| 5,408,322 A | 4/1995 | Hsu et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.

(Continued)

*Primary Examiner* — Avinash Yentrapati

(57) ABSTRACT

A navigational control method for a mobile automation apparatus includes: controlling a depth sensor to capture depth data representing a portion of a facility containing an obstacle; identifying the obstacle from the depth data; determining a probability that the obstacle is static; based on the probability, assigning the obstacle one of a dynamic class, a static class, and at least one intermediate class; updating a map to include a position of the obstacle, and the assigned class; and selecting, based on the assigned class, a navigational control action from a first action type associated with the dynamic class and the intermediate class, and a second action type associated with the static class.

19 Claims, 9 Drawing Sheets

(56) References Cited

U.S. PATENT DOCUMENTS

| | | |
|---|---|---|
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 10,401,852 B2 * | 9/2019 | Levinson ............... G01S 17/931 |
| 10,783,796 B2 * | 9/2020 | Mellinger, III .......... G08G 5/04 |
| 11,301,767 B2 * | 4/2022 | Levinson ............... B60W 40/04 |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |

(56) References Cited

U.S. PATENT DOCUMENTS

| | | |
|---|---|---|
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0177929 A1* | 7/2010 | Kurtz .................. H04N 9/3194 382/173 |
| 2010/0177968 A1* | 7/2010 | Fry .................. G08B 13/19697 600/509 |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0368807 A1* | 12/2014 | Rogan .................. G01S 17/931 356/28 |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |

(56) References Cited

U.S. PATENT DOCUMENTS

| | | |
|---|---|---|
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0077015 A1 | 3/2019 | Shibasaki et al. |
| 2019/0087663 A1 | 3/2019 | Yamazaki et al. |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |
| 2020/0098270 A1* | 3/2020 | Günther ............... G08G 1/166 |
| 2020/0150666 A1* | 5/2020 | Scott .................. G05D 1/0214 |
| 2020/0196405 A1* | 6/2020 | Cao ...................... H05B 47/115 |
| 2022/0048530 A1* | 2/2022 | Wyffels ............... B60W 60/001 |
| 2022/0114406 A1* | 4/2022 | Wyffels ............... G06V 10/809 |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

(56) References Cited

OTHER PUBLICATIONS

Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France.
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).

(56) References Cited

OTHER PUBLICATIONS

Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stiching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stiching with Moving DLT", 2013 Computer Vision Foundation, pp. 2339-2346.
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial infromation Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norrif et al., "Experimental comparison of some classical iterative learning algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.

\* cited by examiner

OBJECT CLASSIFICATION FOR AUTONOMOUS NAVIGATION SYSTEMS

BACKGROUND

Autonomous or semi-autonomous systems, such as a mobile automation apparatus configured to travel a facility (e.g. a retail facility) to collect data therein, perform various navigational actions to detect and avoid obstacles within the facility. Different navigational actions may be taken according to the nature of a given obstacle. However, changes in an obstacle's state and/or imperfect sensor information may lead to inaccurate determination of an obstacle's nature, resulting in sub-optimal navigational behavior by the apparatus.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
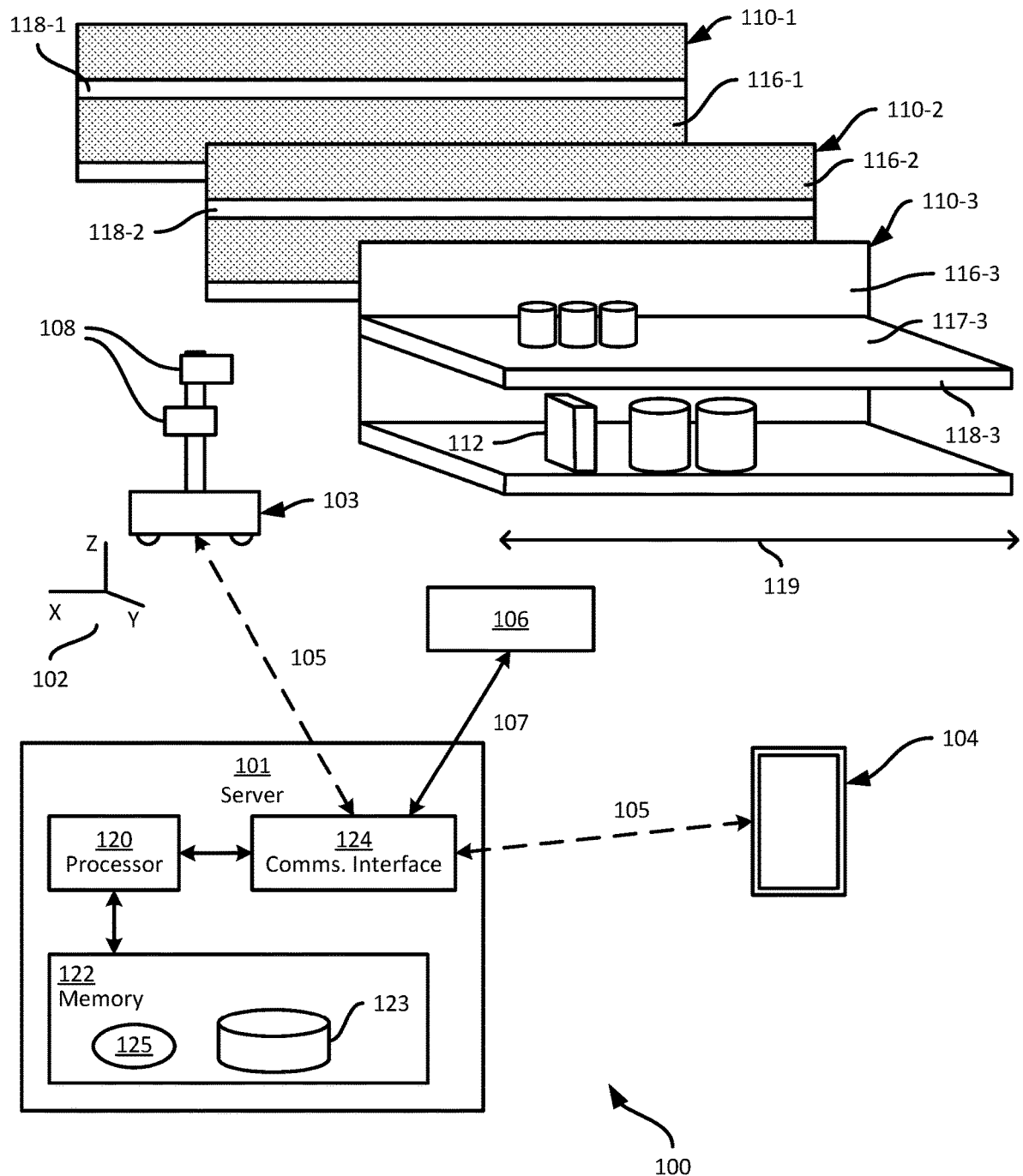
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a navigational control method for a mobile automation apparatus, comprising: controlling a depth sensor to capture depth data representing a portion of a facility containing an obstacle; identifying the obstacle from the depth data; determining a probability that the obstacle is static; based on the probability, assigning the obstacle one of (i) a dynamic class, (ii) a static class, and (iii) at least one intermediate class; updating a map to include a position of the obstacle, and the assigned class; and selecting, based on the assigned class, a navigational control action from (i) a first action type associated with the dynamic class and the intermediate class, and (ii) a second action type associated with the static class.

Additional examples disclosed herein are directed to a computing device, comprising: a depth sensor; a locomotive assembly; and a navigational controller configured to: control the depth sensor to capture depth data representing a portion of a facility containing an obstacle; identify the obstacle from the depth data; determine a probability that the obstacle is static; based on the probability, assign the obstacle one of (i) a dynamic class, (ii) a static class, and (iii) at least one intermediate class; update a map to include a position of the obstacle, and the assigned class; and select, based on the assigned class, a navigational control action from (i) a first action type associated with the dynamic class and the intermediate class, and (ii) a second action type associated with the static class.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112 (also referred to as items), which may also be referred to as items. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. A variety of other support structures may also be present in the facility, such as pegboards, tables, and the like.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 and the items 112 supported by the shelves 110 (generally referred to as shelf data or captured data). Navigation may be performed according to a frame of reference 102 established within the retail facility. The apparatus 103 therefore tracks its pose (i.e. location and orientation) in the frame of reference 102. As will be discussed in greater detail below, the apparatus 103 also detects obstacles within the facility, and executes various navigational processes to traverse certain shelves 110 for imaging as mentioned above, while avoiding such obstacles. The specific navigational processes executed in response to the presence of an obstacle in the path of the apparatus 103 depends at least in part on various attributes of the obstacle.

Obstacles may include the shelves 110, customers within the facility, shopping carts or other objects, and the like. That is, certain obstacles may be mobile, while others may be stationary. Further, certain obstacles may be mobile at some times, and stationary at other times. A mobile (i.e. dynamic) obstacle in the path of the apparatus 103 may move out of the path after a period of time, and the apparatus 103 may therefore be configured, upon encountering a dynamic obstacle, to wait for a period of time with the expectation that the current path will be cleared of the obstacle. A stationary (i.e. static) obstacle, on the other hand, is likely to remain within the path of the apparatus 103. Therefore, the apparatus 103 may be configured, if faced with a static obstacle, to generate a new navigational path to avoid the obstacle. Generation of a new path incurs a computational cost, and may also slow the completion of a data collection task by the apparatus 103, or cause premature termination of the task, e.g. if a given module 110 is rendered inaccessible by a static obstacle.

In other words, the apparatus 103 is configured to proceed differently depending on the expected behavior of the obstacle. Accurately assessing expected obstacle behavior may be difficult, however, as a result of artifacts in sensor data, and changes in the nature of the obstacles themselves. A shopping cart, for example, may be static at some times and dynamic at other times.

The apparatus 103 is therefore configured, as discussed in detail below, to implement a probabilistic model for classifying obstacles, and to employ an obstacle classification system and resulting navigational controls to mitigate the costs in time and/or computational resources that can result from attempting to navigate around static obstacles.

The server 101 includes a special purpose controller, such as a processor 120, specifically designed to control and/or assist the mobile automation apparatus 103 to navigate the facility and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103 and post-processing of captured data, such as a repository 123. The repository 123 can contain, for example, a map of the facility, operational constraints for use in controlling the apparatus 103, the image and/or depth data captured by the apparatus 103, and the like.

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products 112 in the captured data, and detect status information corresponding to the objects). The server 101 maintains, in the memory 122, an application 125 executable by the processor 120 to perform such subsequent processing.

The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process notifications and other information received from the server 101. For example, the client device 104 includes a display 132 controllable to present information received from the server 101.

Figure 2:
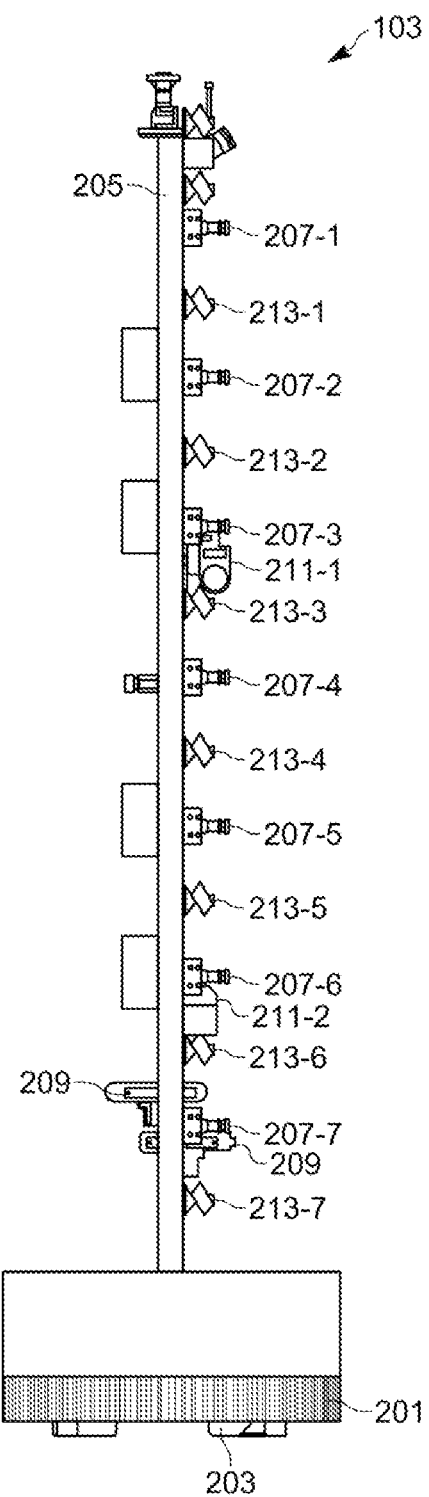
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. The illumination assemblies 213 may be referred to collectively as an illumination subsystem. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. The apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
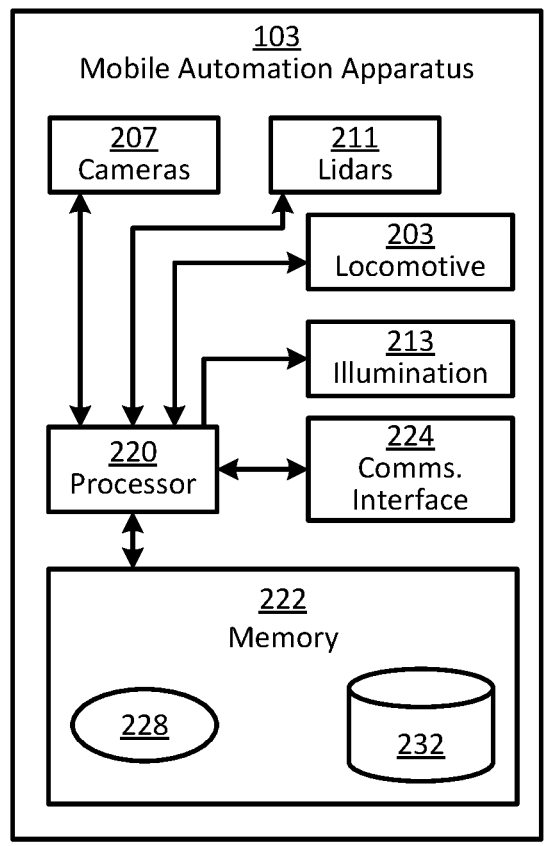
FIG. 3 is a block diagram of certain internal hardware components of the mobile automation apparatus in the system of FIG. 1.

Turning to FIG. 3, certain internal components of the mobile automation apparatus 103 are shown. In particular, apparatus 103 includes a special-purpose navigational controller, such as a processor 220 interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits.

The apparatus 103 also includes a communications interface 224, containing suitable hardware components to enable communication between the apparatus 103 and other computing devices, including the server 101. The interface 224 may enable, for example, wired communications via the dock 106, wireless communications via the above-mentioned WLAN, or both. Via the interface 224, the apparatus 103 may receive instructions from the server 101 to travel to certain portions of the facility to collect image and/or depth data depicting the shelves 110.

The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, Application-Specific Integrated Circuits (ASICs) and the like in other embodiments.

The memory 222 may also store a repository 232 containing, for example, one or more maps of the environment in which the apparatus 103 operates, for use during the execution of the application 228. The repository 232, in the examples discussed below, contains an obstacle map containing locations and other information of obstacles detected by the apparatus 103. In some examples, the repository 232 may store a global map containing information defining the shelves 110 and other substantially permanent structures in the facility, and a separate obstacle map containing other obstacles detected by the apparatus 103, such as human customers or workers and other objects.

In the present example, the apparatus 103 is configured (via the execution of the application 228 by the processor 220) to generate navigational paths to travel through the environment, for example to reach goal locations provided by the server 101. The apparatus 103 is also configured to control the locomotive mechanism 203 to travel along the above-mentioned paths. To that end, the apparatus 103 is also configured, as will be discussed below in greater detail, to detect obstacles in the surroundings of the apparatus 103. The detected obstacles (at least those not appearing in the global map mentioned above, if a global map is used) are assigned classifications, and the apparatus 103 selects navigational control actions to avoid such obstacles based in part on the classifications.

As will be apparent in the discussion below, other examples, some or all of the processing performed by the apparatus 103 may be performed by the server 101, and some or all of the processing performed by the server 101 may be performed by the apparatus 103. That is, although in the illustrated example the application 228 resides in the mobile automation apparatus 103, in other embodiments the actions performed by the apparatus 103 via execution of the application 228 may be performed by the processor 120 of the server 101, either in conjunction with or independently from the processor 220 of the mobile automation apparatus 103. As those of skill in the art will realize, distribution of navigational computations between the server 101 and the mobile automation apparatus 103 may depend upon respective processing speeds of the processors 120 and 220, the quality and bandwidth of the link 105 between the apparatus 103 and the server 101, as well as criticality level of the underlying instruction(s).

Figure 4:
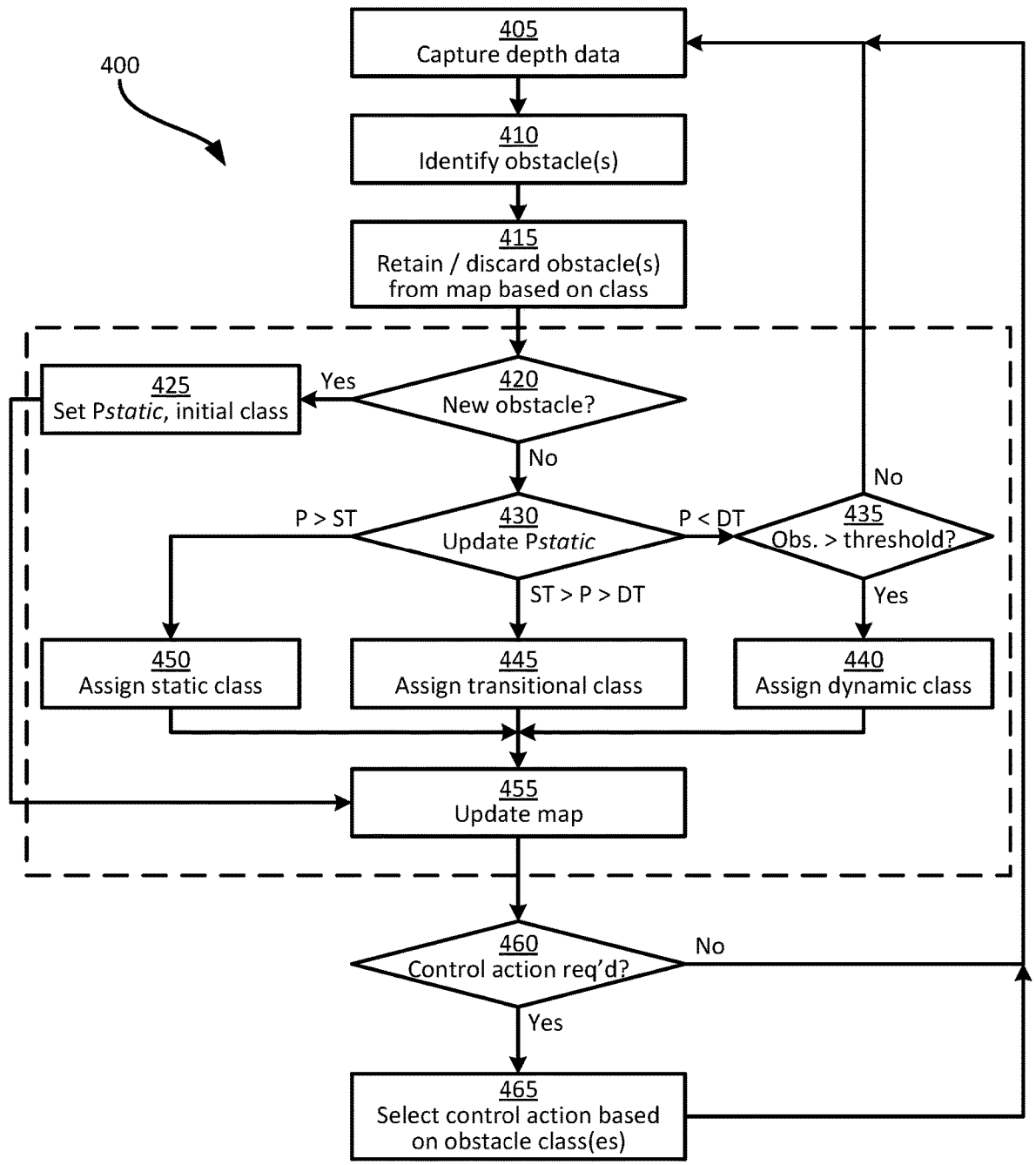
FIG. 4 is a flowchart of a method for obstacle classification at the apparatus of FIG. 1.

The functionality of the application 228 will now be described in greater detail. In particular, the detection and classification of obstacles will be described as performed by the apparatus 103. FIG. 4 illustrates a method 400 of obstacle classification. The method 400 will be described in conjunction with its performance by the apparatus 103.

At block 405, the processor 220 is configured to operate the depth sensor(s) (e.g. the forward-facing depth sensor 209) to capture depth data representing a portion of the facility. In particular, the captured depth data defines any objects within a field of view of the sensor 209 or other suitable depth sensor.

At block 410, the processor 220 is configured to identify any obstacles represented in the depth data. A variety of obstacle identification mechanisms may be employed at block 410, examples of which will occur to those skilled in the art. For example, various edge detection processes, clustering processes and the like may be applied to determine whether the depth data indicates the presence of an obstacle in the field of view of the depth sensor 209.

The identification of an obstacle includes the determination of various attributes of the obstacle. For example, the processor 220 determines the position of the obstacle at block, e.g. within the frame of reference 102, based on the tracked pose of the apparatus 103 itself. The processor 220 can also determine one or more dimensions of the obstacle (e.g. a width). The identification of an obstacle can further include the determination of a velocity of the obstacle, if the processor 220 has previously identified that obstacle (i.e. in previous performances of block 405).

At block 415, having identified any obstacles in the captured depth data from block 405, the processor 220 is configured to retain or discard previously detected obstacles stored in the map mentioned earlier, based on the classification assigned to those obstacles. Classification, as well as retaining mechanisms, are discussed in greater detail below. In this example performance of block 415, it is assumed that no obstacles are currently stored in the map, and no action is therefore required at block 415.

The processor 220 is then configured to process each identified obstacle via the blocks within the dashed box in FIG. 4, beginning at block 420. In general, the processing of each obstacle includes determining a probability that the obstacle is static, and assigning a classification to the obstacle based on the probability. The assigned class defines which navigational actions the apparatus 103 takes when the obstacle interrupts the path being traveled by the apparatus 103. The assigned class also affects the retention mechanism employed by the processor 220 at block 415, to either retain an obstacle that is no longer within the field of view of the depths sensor 209, or discard (i.e. "forget") the obstacle.

The classes assigned to obstacles by the processor 220 include two primary classes, and at least one intermediate class. The primary classes include a dynamic class, assigned to obstacles that are currently in motion or likely to begin moving, and a static class, assigned to obstacles that are not currently in motion and are not likely to begin moving. The intermediate classes include at least a transitional class, assigned to obstacles for which insufficient information has been collected to assign one of the primary classes. In the present example, the intermediate classes also include an initial class, assigned to obstacles for which no previous observations exist in the map stored in the repository 232.

The class assigned to an obstacle affects the navigational control of the apparatus 103 in various ways. For example, when an obstacle is in the path of the apparatus 103, the apparatus 103 may select a first type of control action, or a second type of control action. The first type of control action includes pausing travel along the path for a brief period of time (e.g. five seconds), with the expectation that the obstacle may move out of the path. The first type of control action is therefore suitable for execution in the presence of a dynamic obstacle, which is unlikely to remain in the path of the apparatus 103 for long. The first type of control action can also include adaptive adjustments to travel along the current path, such as reducing velocity along the path without necessarily pausing travel entirely.

The second type of control action includes generating an updated path to guide the apparatus 103 around or away from the obstacle. The second type of control action is therefore suitable for execution in the presence of a static obstacle, which is likely to remain in the path of the apparatus 103. The generation of a new path can be computationally intensive, and may result in a portion of the task assigned to the apparatus 103 remaining incomplete.

In addition to selecting control actions based on detected obstacles, the apparatus 103 selects retention mechanisms to apply to the map of obstacles. Previously observed obstacles are stored in a map, and when a current observation does not result in the identification of a matching obstacle, the previous observation may be discarded or retained, based on various factors including the class of the obstacle. For example, two types of retention mechanism may be applied to an obstacle. If the obstacle is classified as a dynamic obstacle, the processor 220 may discard the obstacle from the map if the obstacle is not currently observed. If, on the other hand, the obstacle is classified as a static obstacle, the processor 220 may retain the obstacle in the map, e.g. for a predefined period of time (e.g. thirty minutes, although other time periods may also be used).

The intermediate classes are distinguished from the primary classes in that navigational actions for intermediate-classed obstacles are of the same type as dynamic obstacles, while map retention actions for intermediate-classed obstacles are of the same type as static obstacles. Thus, for obstacles for which insufficient information is available to classify as static or dynamic, the apparatus 103 may avoid unnecessarily generating a new path, while retaining the obstacle in the map in the event that path regeneration is necessary in the future.

At block 420, the processor 220 is configured to determine whether the obstacle is a newly observed obstacle. As will be apparent to those skilled in the art, the processor 220 can compare the obstacles identified at block 410 to the map, and match currently observed obstacles with previously observed obstacles. If a currently observed obstacle does not have a match in the map, the determination at block 420 is affirmative. Following an affirmative determination at block 420, the processor 220 proceeds to block 425.

Figure 5:
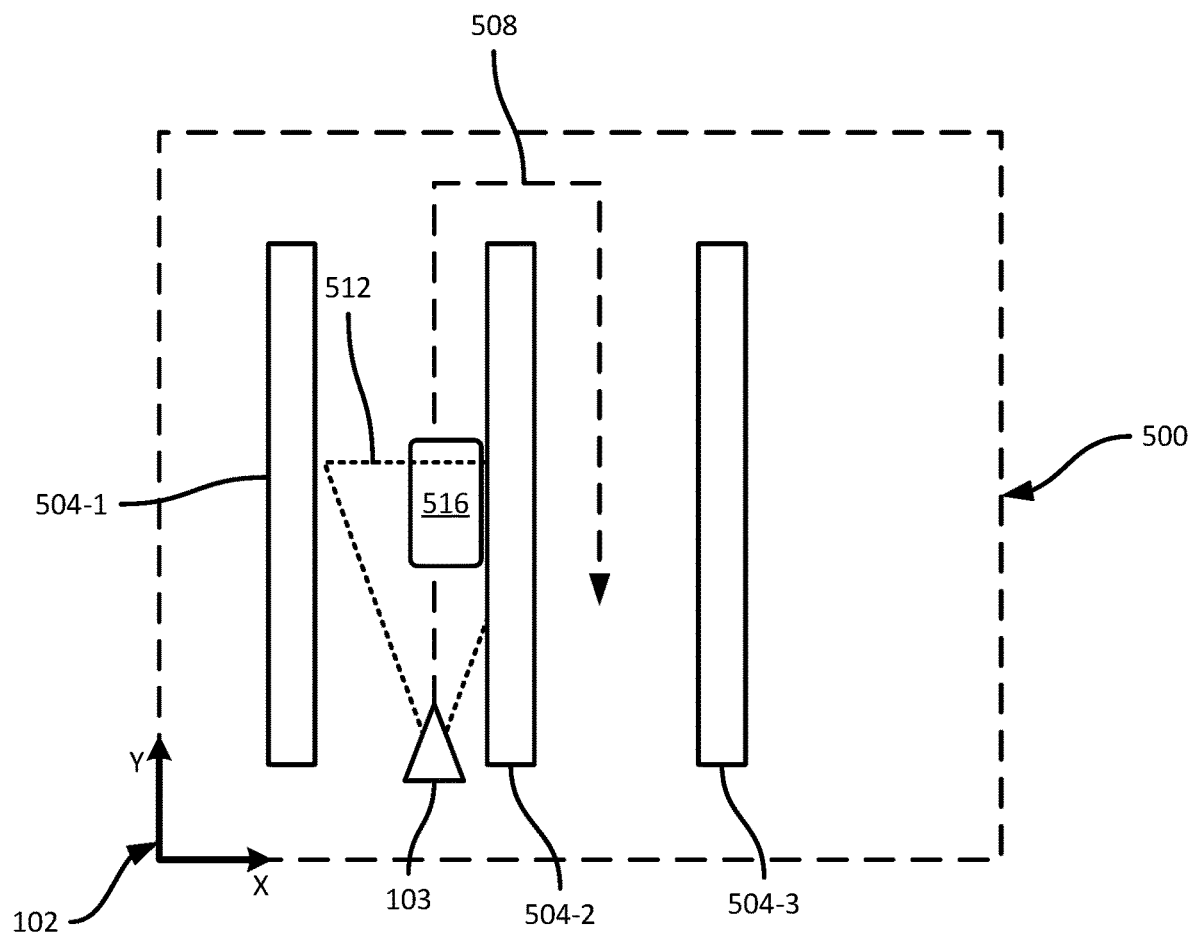
FIG. 5 is a diagram illustrating an example performance of the method of FIG. 4.
Figure 5:
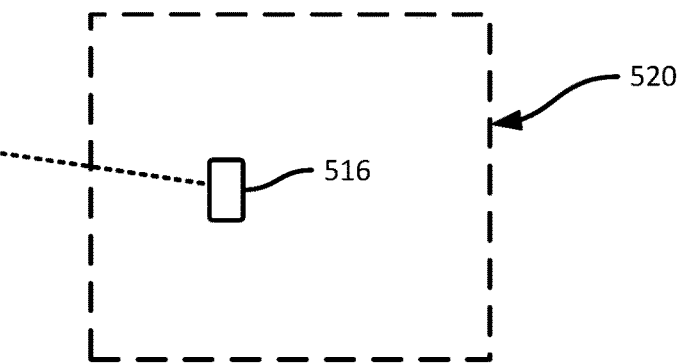

Turning briefly to FIG. 5, an overhead view of a facility 500 in which the apparatus 103 is deployed. The facility includes aisles defined by sets 504-1, 504-2, and 504-3 of modules 110. The apparatus 103 is deployed to travel along the sets 504 of modules and capture images and/or depth data depicting the modules 110. In the illustrated example, the apparatus 103 is configured to travel along a path 508, e.g. to capture images of a first side of the set 504-2, and then a second side of the set 504-2. A field of view 512 of the depth sensor 209 is illustrated as encompassing a portion of an obstacle 516. The obstacle 516 may be, for example, a pallet truck used by a worker in the facility to stock shelves in the sets 504 of modules 110.

Referring again to FIG. 4, it is assumed in this example that the map is empty, and the determination at block 420 is therefore affirmative. At block 425, the processor 220 therefore sets an initial probability that the obstacle 516 is static, and also assigns an initial classification to the obstacle 516. The probability set at block 425, in the present example, is zero, indicating that the obstacle 516 is not likely to be static, or stated another way, that the obstacle 516 is likely to be dynamic. The information available at the first observation of an obstacle may be insufficient to determine whether the obstacle is static or dynamic. However, an initial assumption that the obstacle is dynamic, as at block 425, reduces the likelihood of unnecessary path regeneration, as will be apparent in the discussion below. Further, assignment of the initial class, rather than a dynamic class, to the obstacle reflects uncertainty in the actual state of the obstacle and enables the apparatus 103 to respond to the presence of the obstacle 516 differently than either static or dynamic-classified obstacles, as will also be discussed below.

Having set the probability and assigned the initial class to the obstacle 516, the processor 220 is configured to update a map at block 455. Updating the map includes storing the position of the obstacle 516 (e.g. in the frame of reference 102), as well as the class of the obstacle 516, the probability associated with the obstacle 516, and a timestamp indicating the time of the most recent observation of the obstacle 516. Returning to FIG. 5, an example map 520 is illustrated, in which the position of the obstacle 516 is indicated (the sets 504 of modules 110 are omitted for simplicity). In association with the obstacle 516, the apparatus 103 stores the above-mentioned timestamp, probability $P_{static}$, class, and one or more attributes of the obstacle 516. In this example the attributes include an observed velocity and an observed size (e.g. width) of the obstacle. The attributes of the obstacle 516 can also include other velocity-related, size-related, or positional attributes. For example, an acceleration of the obstacle 516 may be stored. In further examples, a position of the obstacle 516 relative to a permanently mapped obstacle such as a shelf module may be stored as an attribute.

Returning to FIG. 4, at block 460, the processor 220 determines whether a navigational control action is required as a result of the obstacles in the map 520. For example, the processor 220 may determine whether any obstacles in the map 520 are on the path 508, and are within a predefined proximity of the apparatus 103.

When the determination at block 460 is affirmative, at block 465 the apparatus 103 selects between the first and second types of action mentioned above. Otherwise, the processor 220 returns to block 405 to capture the next set of depth data. For example, the processor 220 may be configured to control the depth sensor 209 to capture a set of depth data at a predefined frequency, e.g. 20 Hz, with the remainder of the method 400 being performed for each set.

In this example, it is assumed that the obstacle 516 is sufficient close to the apparatus 103 to result in an affirmative determination at block 460. At block 465, because the obstacle 516 has an intermediate classification, the processor 220 selects a navigational control action of the first type, associated with dynamic obstacles. That is, the processor 220 controls the apparatus 103 to pause travel along the path 508 for a predetermined period of time. Performance of the method 400 then returns to block 405.

It is assumed, for illustrative purposes, that following the next capture of depth data at block 405, the processor 220 identifies the obstacle 516, and the obstacle 516 as shown in the map 520 is therefore retained (i.e. no retention or discarding action is selected at block 415). At block 420, the determination is negative. At block 430, the processor 220 is configured to generate an updated probability that the obstacle 516 is static. The generation of updated probabilities is discussed in greater detail further below. In general, the probability is based at least on the observed velocity of the obstacle 516. The probability may also be based on other attributes of the obstacle, such as the observed size of the obstacle (e.g. a width), as well as the additional attributes mentioned earlier such as acceleration, positions relative to other obstacles, and the like. The probability is also based, in this example, on the previous probability (i.e. stored in association with the map 520).

Figure 6:
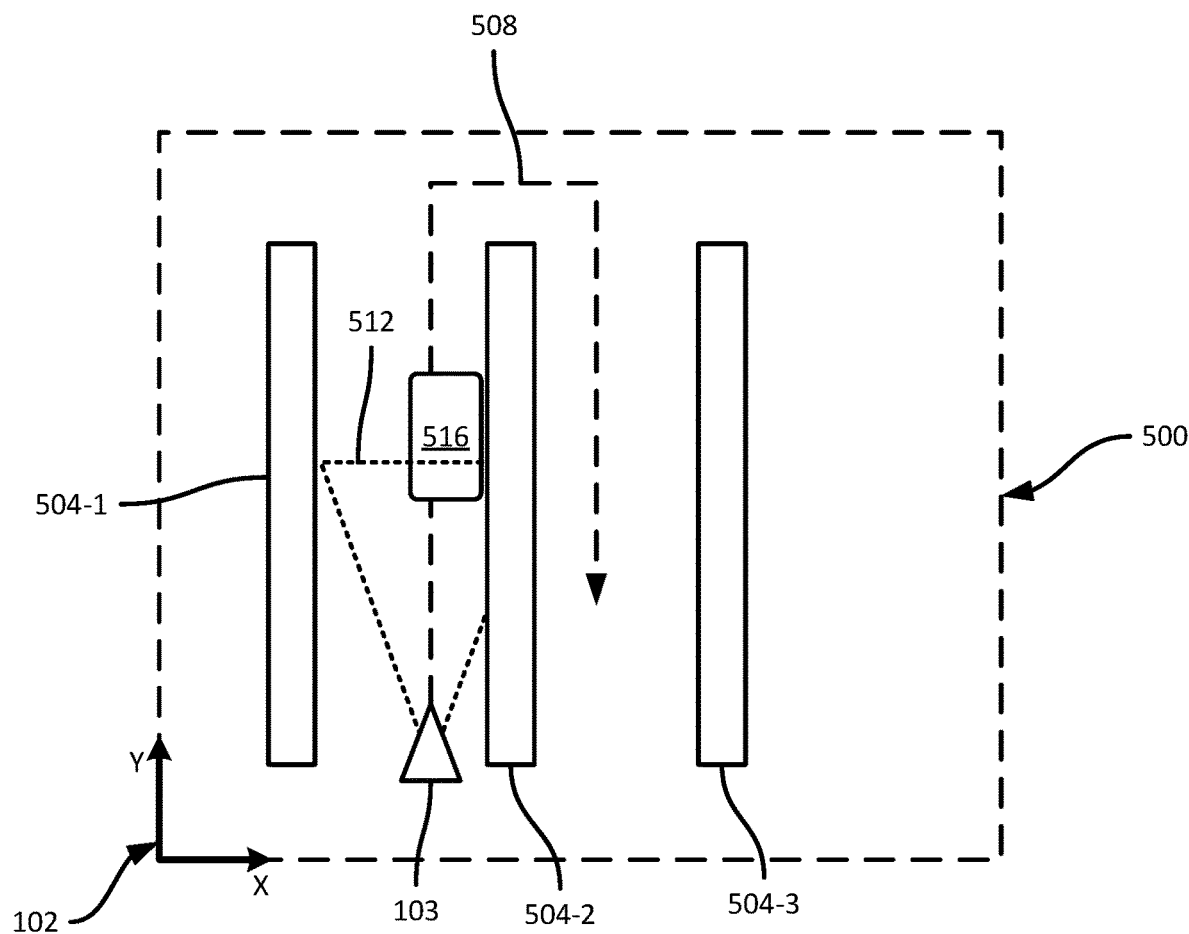
FIG. 6 is a diagram illustrating another example performance of the method of FIG. 4.
Figure 6:
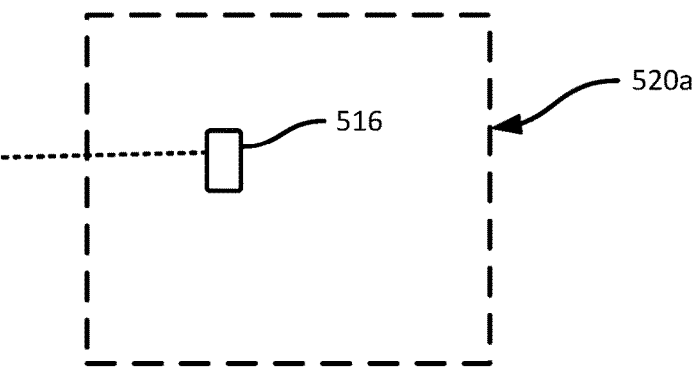

Referring to FIG. 6, the obstacle 516 is shown having moved away from the apparatus 103 (which itself has not moved, as a result of the control action selected at the earlier performance of block 465). An updated probability that the obstacle 516 is static is generated at block 430. As shown in FIG. 5, the updated probability has a value of 0.3. The processor 220 is configured to compare the updated probability to an upper threshold (static threshold, or ST) and a lower threshold (dynamic threshold, or DT). A class is assigned to the obstacle 516 based on such comparisons. In particular, when the probability is below the lower threshold, the obstacle 516 is classified as dynamic at block 440. When the probability is between the upper and lower thresholds, the obstacle 516 is classified as a transitional obstacle at block 445. When the probability is above the upper threshold, the obstacle 516 is classified as static at block 450.

In this example, the lower threshold is set to 0.4 (i.e. a 40% probability that the obstacle 516 is static), the processor 220 therefore proceeds to assign the dynamic class to the obstacle 516. In some examples, as shown in FIG. 4, prior to assigning the dynamic class to the obstacle 516, the processor 220 can determine at block 435 whether a count of observations of the obstacle 516 exceeds a threshold. For example, such a count may be maintained in the map. When the determination is negative, the initial class is retained instead of the dynamic class being assigned. In this example performance, the determination at block 435 is assumed to be affirmative. In other examples, a similar determination may be performed before block 445, in addition to or instead of before block 440.

Following classification of the obstacle 516 as a dynamic obstacle at block 440, the map 520 is updated at block 455. In particular, as shown in FIG. 6, the map 520 is updated to a map 520a, containing the current position of the obstacle 516, as well as an updated timestamp of the most recent observation of the obstacle 516, updated size and velocity attributes, and the above-mentioned probability and class.

At block 460, the determination is negative, e.g. because the obstacle 516 is sufficiently distant from the apparatus 103. The processor 220 therefore returns to block 405.

Figure 7:
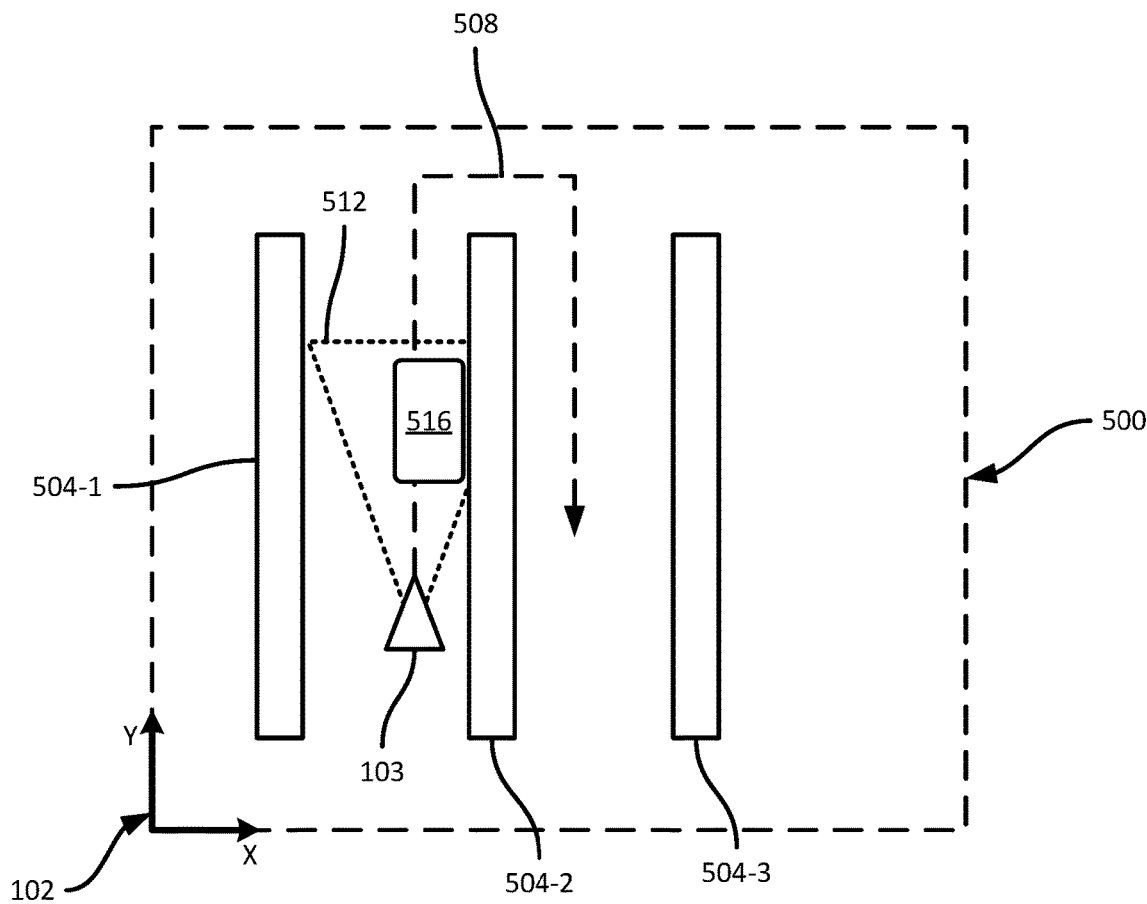
FIG. 7 is a diagram illustrating a further example performance of the method of FIG. 4.
Figure 7:
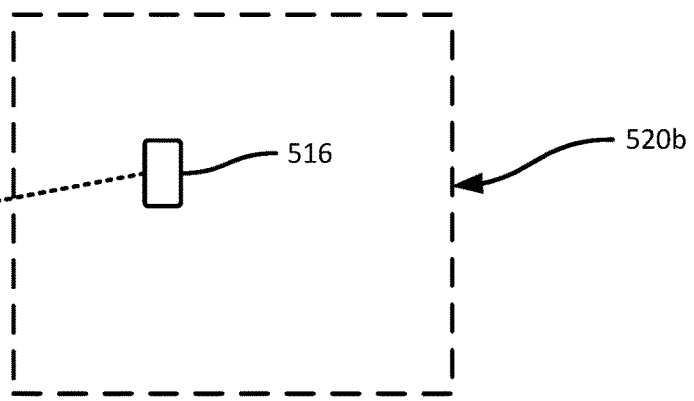

In a further performance of the method 400, it assumed that the obstacle 516 stops moving in the position shown in FIG. 7. Thus, as the apparatus 103 approaches the obstacle 516, the probability generated at block 430 rises to 0.75. The upper threshold is assumed to be 0.8, and from block 430 the processor 220 therefore proceeds to block 445, to assign the transitional class to the obstacle 516. The transitional class, in effect, indicates that the obstacle 516 is likely a dynamic obstacle, but is temporarily static. At block 455, the map 520a is updated to a map 520b, as shown in FIG. 7.

At block 460, the processor 220 determines that a control action is required due to the proximity of the obstacle 516 and the position of the obstacle on the path 508. Since the obstacle 516 is classified as a transitional obstacle, the selected action is to pause, e.g. for the five-second period mentioned earlier.

In subsequent observations (i.e. subsequent captures at block 405 and processing via blocks 410-455), the obstacle 516 may begin moving again, in which case the probability associated with the obstacle 516 may decrease sufficiently to be classified as a dynamic obstacle, or may remain between the upper and lower thresholds. In other examples, if the obstacle 516 remains stationary for a sufficient period of time, the probability generated at block 430 will exceed the upper threshold, and the obstacle 516 will be reclassified as a static obstacle at block 450.

Following reclassification to static at block 450, the apparatus 103 would no longer perform the "pause" control action at block 465. Instead, the processor 220 selects the second type of control action at block 465, and generates an updated path to navigate around the obstacle 516.

Thus, by employing the transitional class, the apparatus 103 may avoid prematurely generating a new path, until the likelihood that a stationary obstacle will remain stationary is sufficiently high. However, even if the probability that the obstacle 516 is static does not exceed the upper threshold, the use of the transitional class may nevertheless reduce the risk of wasteful path generation, as shown in the example illustrated in FIG. 8.

Figure 8:
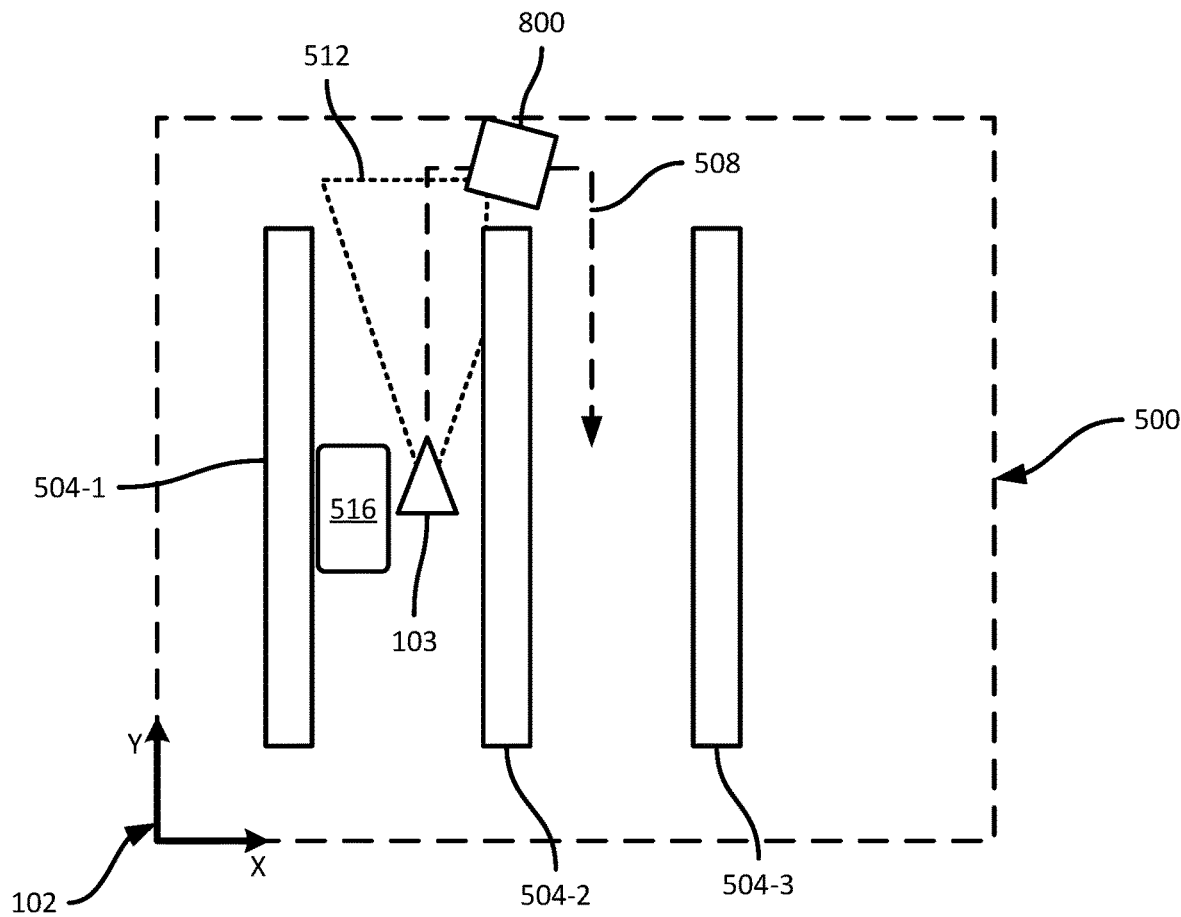
FIG. 8 is a diagram illustrating another example performance of the method of FIG. 4.
Figure 8:
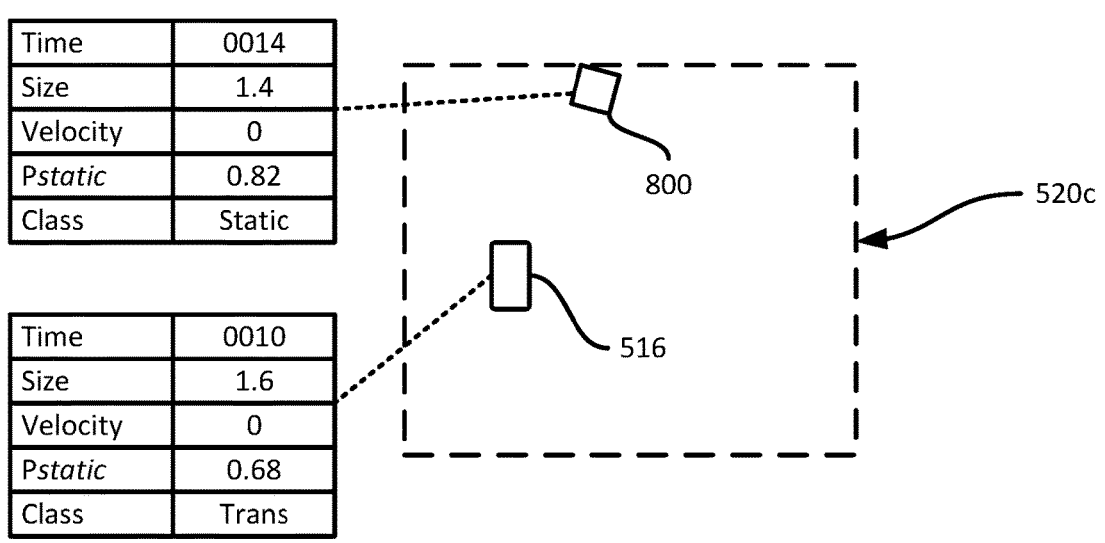

FIG. 8 shows an alternate scenario, in which the obstacle 516 moved to the other side of the aisle before becoming stationary, permitting the apparatus 103 to pass the obstacle 516 along the path 508. As illustrated, the obstacle 516 is no longer within the field of view 512 of the depth sensor 209. However, because the obstacle 516 was most recently classified as a transitional obstacle (with a probability of 0.68, as shown in the updated map 520c), the processor 220 is configured to apply a static-type retention mechanism to the obstacle 516 at block 415.

In particular, the processor 220 is configured to determine whether the timestamp in the map 520c associated with the obstacle 516 is older than a predefined timeout period. When the timestamp is more recent than the timeout period, the obstacle 516 is retained in the map, although the attributes and probability associated with the obstacle 516 are no longer updated. That is, although transitional obstacles are handled similarly to dynamic obstacles for the purpose of navigational control actions at block 465, such obstacles are handled similarly to static obstacles for map retention purposes at block 415. In some examples, different timeout periods can be applied to static obstacles and transitional obstacles, e.g. with the static timeout period being longer.

The significance of the handling of transitional obstacles at block 415 is clear in the event that a further obstacle 800 is detected, and classified as static. As seen in FIG. 8, the obstacle 800 obstructs the path 508, and given the static classification, the apparatus 103 may determine that generation of an updated path is necessary at block 465. Such a path is generated taking into account the obstacle 516, due to the presence of the obstacle 516 in the map 520c. In the absence of the transitional class and associated navigational and map retention behavior, the apparatus 103 may have simply discarded the obstacle 516 from the map 520c. In the absence of the obstacle 516, a replacement path traveling back along the aisle may have been generated, only to be obstructed by the obstacle 516 when the apparatus 103 turns around to begin executing the new path.

Figure 9:
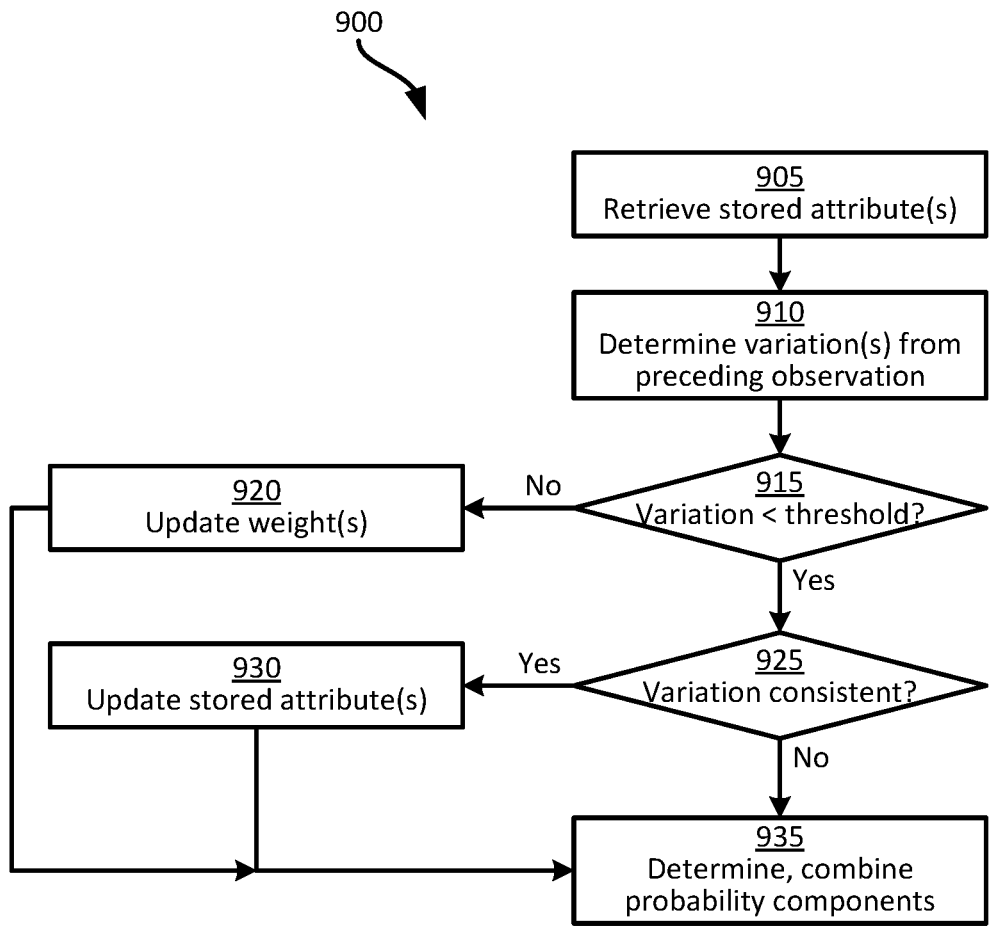
FIG. 9 is a flowchart of a method of determining a probability at block 430 of the method of FIG. 4.

Turning now to FIG. 9, a method 900 of generating an updated probability at block 430 is illustrated. As noted above, the probability can be generated based on attributes such as velocity and, optionally, size. The data captured by the sensor 209 may be noisy, however, and substantial variations may therefore be present in consecutive observations of an obstacle. The method 900 enables the processor 220 to mitigate the effects of such variations on the probability generation.

In general, the probability may be generated as separate components for each attribute, e.g. a size component and a velocity component. For example, the size component may increase with size, e.g. by employing a base value above one with an exponent based on the size. The velocity component, by contrast, may decrease with velocity, e.g. by employing a base value between zero and one with an exponent based on the velocity.

The above components may be combined to produce the probability that the obstacle is static. The components may be weighted when combined, however. The method 900 also enables the processor 220 to adjust the weights applied to each component based on variability of the incoming sensor data.

At block 905, the processor 220 is configured to retrieve stored attributes (e.g. size and velocity) corresponding to the obstacle, e.g. from the map 520. At block 910, the processor 220 determines, for each attribute, a variation between the retrieved attribute and the current attribute (i.e. from the most recent performance of block 410). Obstacles are typically not expected to change in size, and are also not expected to change rapidly in velocity. Therefore, larger changes in size or velocity may indicated lower quality sensor data.

At block 915, for each attribute, the processor 220 determines whether the difference between the stored attribute and the current attribute (e.g. expressed as a fraction of the stored attribute) falls below a threshold. When the determination is negative (i.e. when the difference exceeds the threshold), the current attribute may be inaccurate due to sensor artifacts. The processor 220 is therefore configured to update the weights applied to each component at block 920. For example, the processor 220 can compare the differences between stored and current values for each attribute. The processor 220 can then select the attribute with the smallest variation, and increase the corresponding weight while decreasing the weight of the other attribute.

When the determination at block 915 is affirmative, the processor 220 does not update the weights, but instead proceeds to block 925. At block 925, the processor 220 determines whether the variation between the stored attributes and current attributes has remained below the threshold for a predetermined length of time or number of observations. For example, the processor 220 can increment a counter for each affirmative determination at block 915, and apply a threshold to the counter at block 925. When the determination at block 925 is affirmative, the current attributes are assumed to be sufficiently reliable to use in the future as the stored attributes. At block 930, the stored attributes are therefore replaced with the current attributes. It will be understood that blocks 925 and 930 are performed independently for each attribute, if multiple attributes are used.

When the determination at block 925 is negative, or after the performance of block 920 or block 930, the processor 220 determines the components as mentioned above, using the stored attributes (i.e. not necessarily the current attributes), and the weights as adjusted at block 920, or as previously set. Following the first observation of an obstacle, the weights may be initialized with random values, or with default values (e.g. 0.5 for each weight).

In other examples, blocks 905-930 may be omitted, and the component probabilities may simply be generated and combined based on the current attributes, with a fixed set of weights.

In some examples, combining the component probabilities can include summing the components. In other examples, combining the component probabilities includes summing the components, and weighting the sum with a previous probability. For example, the probability generated at block 935 can include multiplying the sum of the current components by $(1-P_{N-1})$, where $P_{N-1}$ is the result of the preceding performance of block 935, and adding the result to the square of $P_{N-1}$. As a result, the current probability acts as a modifier on the preceding probability, mitigating against significant changes to the probability over successive performances of block 430.

Variations to the above systems and methods are contemplated. In some implementations, more complex implementations of the classification decisions discussed above may be implemented. For example, certain class transitions may be prevented, such as a transition from the static class to the transitional class. In such examples, if an obstacle classified as static begins moving, the probability may be overridden and reset to zero, and the class therefore reset to dynamic, rather than returning to the transitional class. In further examples, a transition directly from the dynamic class to the static class may be prevented, such that obstacles must be reclassified first as transitional obstacles before being classified as static.

As will now be apparent to those skilled in the art, the mechanisms discussed above enable the apparatus 103 to process depth sensor data to increase the efficiency of operation of the apparatus 103, for example by reducing the incidence of unnecessary path regeneration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A navigational control method for a mobile automation apparatus, comprising:
controlling a depth sensor to capture depth data representing a portion of a facility containing an obstacle;
identifying the obstacle from the depth data;
determining a probability that the obstacle is static;
based on the probability, assigning the obstacle one of (i) a dynamic class, (ii) a static class, and (iii) at least one intermediate class;
updating a map to include a position of the obstacle, and the assigned class;
selecting, based on the assigned class, a navigational control action from (i) a first action type associated with the dynamic class and the intermediate class, and
(ii) a second action type associated with the static class;
and,
retaining, based on the assigned class, the obstacle in the map according to one of (i) a first retention mechanism associated with the dynamic class, and (ii) a second retention mechanism associated with the static class and the intermediate class.

2. The method of claim 1, wherein identifying the obstacle includes detecting at least one attribute of the obstacle from the depth data; and
wherein determining the probability is based on the at least one attribute.

3. The method of claim 2, wherein the at least one attribute includes a size attribute and a velocity attribute, and wherein determining the probability includes:
determining a first probability component based on the size attribute;
determining a second probability component based on the velocity attribute; and
combining the first and second component probabilities.

4. The method of claim 3, wherein combining the component probabilities includes applying respective weights to the component probabilities.

5. The method of claim 1, wherein the intermediate class includes a transitional class; and
wherein assigning the one of the classes includes:
assigning the dynamic class when the probability is below a lower threshold;
assigning the static class when the probability is above an upper threshold; and
assigning the transitional class when the probability is between the upper and lower thresholds.

6. The method of claim 1, wherein the intermediate class includes an initial class; and wherein the method further comprises:
determining whether the map contains a previous observation of the obstacle; and
when the map does not contain a previous observation of the obstacle, assigning the initial class to the obstacle, and setting the probability to an initial value.

7. The method of claim 1 wherein the map includes a timestamp corresponding to the most recent observation of the obstacle; and wherein first retention mechanism includes:
discarding the obstacle from the map when the timestamp is older than a timeout period.

8. The method of claim 7, wherein the timeout period is one of a static timeout period corresponding to static obstacles, and a transitional timeout period corresponding to transitional obstacles, and wherein the static timeout period is greater than the transitional timeout period.

9. The method of claim 1, wherein selecting the navigational control action includes:
determining whether the obstacle is in a current path of the mobile automation apparatus; and
when the obstacle is in the current path,
(i) modifying travel along the path if the obstacle is assigned the dynamic class or the at least one intermediate class, or
(ii) generating an updated path to avoid the obstacle, if the obstacle is assigned the static class.

10. A computing device, comprising: a depth sensor;
a locomotive assembly; and
a navigational controller configured to:
control the depth sensor to capture depth data representing a portion of a facility containing an obstacle;
identify the obstacle from the depth data;
determine a probability that the obstacle is static;
based on the probability, assign the obstacle one of (i) a dynamic class, (ii) a static class, and (iii) at least one intermediate class;
update a map to include a position of the obstacle, and the assigned class; and
select, based on the assigned class, a navigational control action from (i) a first action type associated with the dynamic class and the intermediate class, and (ii) a second action type associated with the static class
wherein: the intermediate class includes an initial class, and the navigational controller is further configured to:
determine whether the map contains a previous observation of the obstacle, and
when the map does not contain a previous observation of the obstacle, assign the initial class to the obstacle, and set the probability to an initial value.

11. The computing device of claim 10, wherein the navigational controller is configured to identify the obstacle by detecting at least one attribute of the obstacle from the depth data; and
wherein determination of the probability is based on the at least one attribute.

12. The computing device of claim 11, wherein the at least one attribute includes a size attribute and a velocity attribute, and wherein the navigational controller is configured to determine the probability by:
determining a first probability component based on the size attribute;
determining a second probability component based on the velocity attribute; and
combining the first and second component probabilities.

13. The computing device of claim 12, wherein the navigational controller is configured to combine the component probabilities by applying respective weights to the component probabilities.

14. The computing device of claim 10, wherein the intermediate class includes a transitional class; and
wherein the navigational controller is configured to assign the one of the classes by:
assigning the dynamic class when the probability is below a lower threshold;
assigning the static class when the probability is above an upper threshold; and
assigning the transitional class when the probability is between the upper and lower thresholds.

15. The computing device of claim 10, wherein the navigational controller is further configured to:
based on the assigned class, retain the obstacle in the map according to one of (i) a first retention mechanism associated with the dynamic class, and (ii) a second retention mechanism associated with the static class and the intermediate class.

16. The computing device of claim 15, wherein the map includes a timestamp corresponding to the most recent observation of the obstacle; and
wherein the navigational controller is configured to perform the first retention mechanism by:
discarding the obstacle from the map when the timestamp is older than a timeout period.

17. The computing device of claim 16, wherein the timeout period is one of a static timeout period corresponding to static obstacles, and a transitional timeout period corresponding to transitional obstacles, and wherein the static timeout period is greater than the transitional timeout period.

18. The computing device of claim 10, wherein the navigational controller is configured to select the navigational control action by:
- determining whether the obstacle is in a current path of the mobile automation apparatus; and
- when the obstacle is in the current path,
  - (i) pausing travel along the path if the obstacle is assigned the dynamic class, or
  - (ii) generating an updated path if the obstacle is assigned the static class.

19. A navigational control method for a mobile automation apparatus, comprising:
- controlling a depth sensor to capture depth data representing a portion of a facility containing an obstacle;
- identifying the obstacle from the depth data by detecting at least one attribute of the obstacle;
- determining a probability that the obstacle is static based on the at least one attribute;
- based on the probability, assigning the obstacle one of (i) a dynamic class, (ii) a static class, and (iii) at least one intermediate class; and
- updating a map to include a position of the obstacle, and the assigned class;
- selecting, based on the assigned class, a navigational control action from (i) a first action type associated with the dynamic class and the intermediate class, and (ii) a second action type associated with the static class, wherein:
- the at least one attribute includes a size attribute and a velocity attribute, and
- determining the probability includes:
  - determining a first probability component based on the size attribute,
  - determining a second probability component based on the velocity attribute, and
  - combining the first and second component probabilities.

* * * * *